(12) United States Patent
Kunnummal (10) Patent No.: US 8,788,499 B2
(45) Date of Patent: Jul. 22, 2014

(54) SYSTEM AND METHOD FOR FINDING TOP N PAIRS IN A MAP-REDUCE SETUP

(75) Inventor: Shaji Illias Chennan Kunnummal, Kerala (IN)

(73) Assignee: Yahoo! Inc., Sunnyvale, CA (US)

( * ) Notice: Subject to any disclaimer, the term of this patent is extended or adjusted under 35 U.S.C. 154(b) by 704 days.

(21) Appl. No.: 12/548,788

(22) Filed: Aug. 27, 2009

(65) Prior Publication Data

US 2011/0055243 A1    Mar. 3, 2011

(51) Int. Cl.
*G06F 17/30* (2006.01)
*G06F 15/16* (2006.01)

(52) U.S. Cl.
USPC .......................................... 707/737; 707/802

(58) Field of Classification Search
USPC ......................................... 707/769, 737, 802
See application file for complete search history.

(56) References Cited

U.S. PATENT DOCUMENTS

| | | | | |
|---|---|---|---|---|
| 5,911,140 | A * | 6/1999 | Tukey et al. | 1/1 |
| 6,263,337 | B1 * | 7/2001 | Fayyad et al. | 1/1 |
| 7,590,620 | B1 * | 9/2009 | Pike et al. | 1/1 |

OTHER PUBLICATIONS

Dean et al., "MapReduce: Simplified Data Processing on Large Clusters", Communications of the ACM, Jan. 2008, vol. 51, No. 1, pp. 107-113.
Lämmel, "Google's MapReduce Programming Model—Revisited*", Data Programmability Team, Microsoft Corp., Redmond, WA, date unknown, 42 pages.

* cited by examiner

*Primary Examiner* — Alex Gofman
(74) *Attorney, Agent, or Firm* — Berkeley Law & Technology Group, LLP (57) ABSTRACT

According to an example embodiment, a special purpose computing apparatus includes, but is not limited to, one or more processors programmed with instructions to, based at least in part, on one or more signals representative of a plurality of splits defined by a map process that implements a signature function, compute a density value for at least one of the plurality of splits, where the density value is representative of an expected contribution of the at least one split to a top N key/value pairs of a data set, the data set comprising the key/value pairs.

16 Claims, 3 Drawing Sheets

SYSTEM AND METHOD FOR FINDING TOP N PAIRS IN A MAP-REDUCE SETUP

BACKGROUND

1. Field

The subject matter disclosed herein relates to finding the top N pairs in a map-reduce setup.

2. Information

Examples of top N queries include finding the top N query terms driving web traffic to a website or a front page of a website (e.g., Yahoo! Mail, Yahoo! Finance, etc), the top N query terms based on total revenue that those terms generate, finding the top N users associated with an interest category based on their past browsing history (behavioral targeting), finding the top N stories based on the number of visits (content optimization), or finding the top N advertisements based on the revenue generated (ad display optimization).

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

In one particular implementation of a map-reduce setup, where a data set is very large and in key/value pair form, the problem of finding the top N key/value pairs may be solved in the following manner. First, map processes may be executed. The map process may read a set of key/value pairs, and apply a "signature" or hash function on the key. The value of this function may determine to which split the key/value pair should go. For purposes of this disclosure, the term "split" refers to a grouping that results from execution of a map process, where the grouping includes at least one key/value pair. The one or more key/value pairs in the split may all be assigned to the same reduce process for further processing.

Next, reduce processes may be run. There may be a one-to-one correspondence between the reduce processes and the number of splits. That is, the kth reduce process may aggregate the entire key/value pairs in the kth split, which will have a contribution from all the map processes. Finally, a process collects the top N pairs from the output of each reduce process and generates the final top N set.

Figure 1:
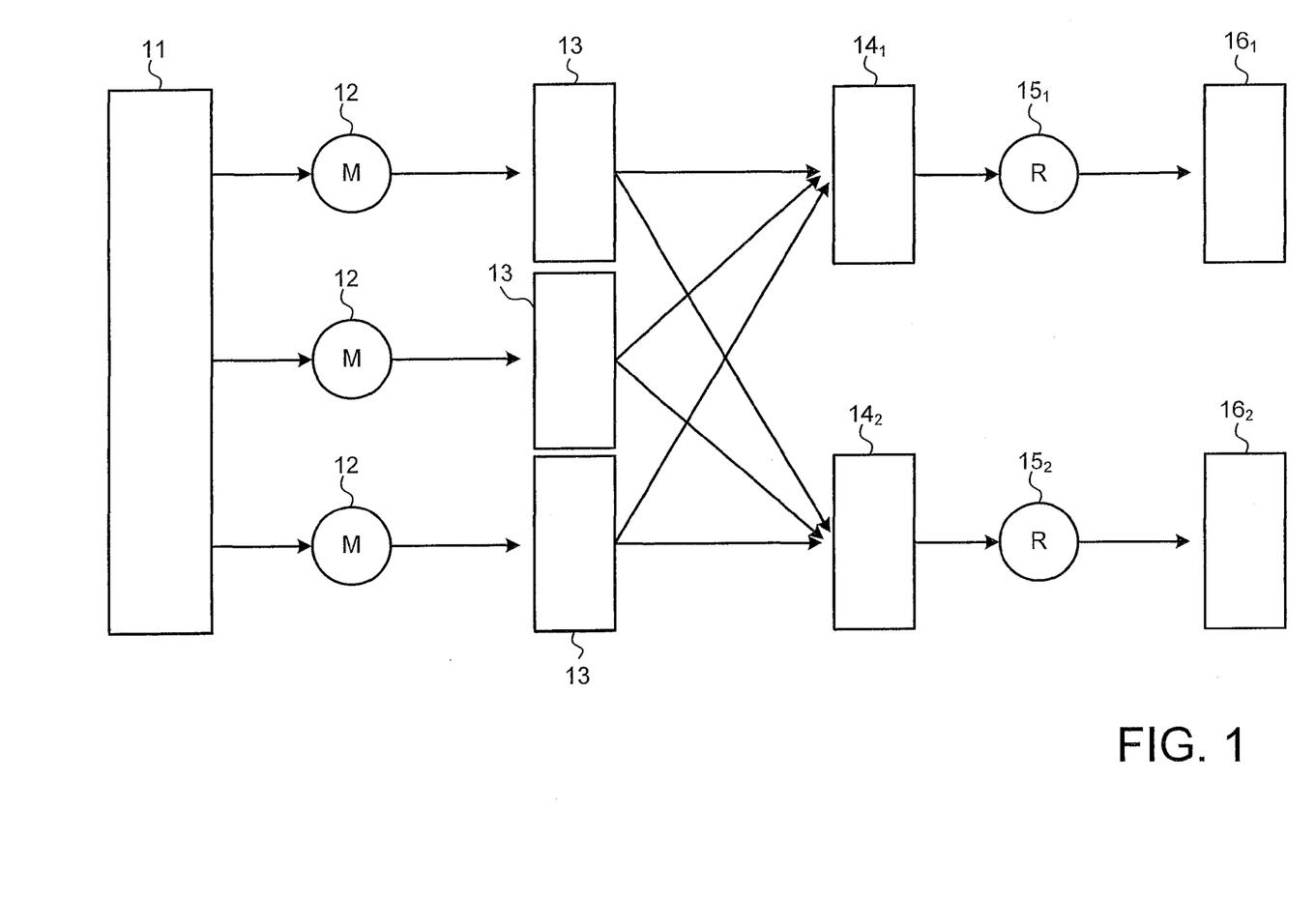
FIG. 1 shows an implementation of a multi-stage process to find top N key/value pairs such as a map-reduce process according to an embodiment.

FIG. 1 shows an implementation of a multi-stage process to find top N key/value pairs such as a map-reduce process according to an embodiment. Input data 11 may be partitioned among multiple instances of a map process 12. In one embodiment, instances of the map process 12 may execute on separate computing platforms. For example, if the input data 11 is a text file, such a text file may be partitioned into three portions with one portion being assigned to each of three instances of map process 12.

In one embodiment, instances of a map process 12 may be assigned for execution to one of a plurality of computing platforms. FIG. 1 depicts three instances of map process 12. However, many more than three such instances of a map process may be executed simultaneously, and many more than three computing platforms may be operated in parallel to execute such map processes on input data 11. Map processes 12 may provide intermediate data 13 as output data. In one particular implementation, such intermediate data 13 may comprise a plurality of keys and values associated with one another in the form of, for example, key/value pairs.

Input data 11 may take any one of several forms. In one particular example, for the purpose of illustration, input data 11 may comprise a text file. Here, an object of the map and reduce functions may be to find a number of occurrences of certain words, such as "the" and "apple" in the text file. This text file may be partitioned into three portions, or partitions, and one partition may be assigned to each of three map processes 12 shown in FIG. 1, for example. Map processes 12 may take each line of text in their respective partitions and identify each distinct word that occurs in such line of text, and a number of times it occurs.

If such a map process 12 were to process a line containing two instances of the word "the," the map process might provide a key/value pair with "the" as a key and "2" as a value. For reference, such a key/value pair might be represented as {the, 2}. Likewise, if the same line contained one occurrence of "apple," a key/value pair might be output with "apple" as a key and 1 as a value. This might be represented as {apple, 1} for reference purposes. A map process 12 may continue until all words in such line have been rendered as key/value pairs, and until all lines of text in a partition have been processed and key/value pairs have been created. All key/value pairs so produced in map processes 12, taken together, constitute intermediate data 13. As illustrated below, portions of intermediate data 13 may be allocated among portions of intermediate data 14 to be processed by associated reduce processes 15.

Intermediate data 13 provided by a particular map process 12 may not be maintained in any particular order, and may be stored/saved by the associated map process 12 separately from intermediate data 13 provided by other map processes 12. Intermediate data 13 provided by one map process 12 may contain key/value pairs with keys that also appear in intermediate data 13 provided by other map processes 12. Continuing the foregoing example, it may be likely that lines of text in all partitions would include occurrences of common words such as "the." In order to prepare intermediate data 14 for a reduce process 15, a separate portion 14 of intermediate data may be created for each key, and all key/value pairs of intermediate data 13 from the output of any map process 12 may be stored in such a portion 14 of intermediate data. Collections of such portions of intermediate data 14 may be used as input data for reduce processes 15.

In particular embodiments, portions 14 of intermediate data may be of different sizes. In the foregoing example, and assuming a text having 10,000 lines, the word "the" may occur in 5,000 of such lines. A portion 14 associated with the word "the" as a key may then include 5,000 key/value pairs with "the" as a key. By contrast, "apple" may occur less frequently in the lines of text, for example five times. Here, accordingly, a portion 14 of intermediate data for the key "apple" might thus contain only five key/value pairs with "apple" as a key. In the end, according to an implementation of a map-reduce framework, a number of different portions 13 of intermediate data may equal a number of map processes 12, and the number of different portions 14 of intermediate data may equal a number of reduce processes 15.

In one implementation of a map-reduce process, portions 14 of intermediate data may be presented to reduce processes 15 for processing. Each such reduce process 15 may produce a series of key/value pairs of output data 16 that may then be combined or merged into a final output data set (not shown). Continuing the foregoing example, a user may provide a reduce process that takes key/value pairs in an associated portion 14 of intermediate data and sum values of each such key/value pair in the associated portion 14. A portion 14 having "the" as a key might contain 1,000 key/value pairs representing lines of text in which "the" appeared two times (e.g., {the, 2}) and 4,000 key/value pairs representing lines of text in which "the" appeared one time (e.g., {the, 1}). Thus, summing the values of all the key/value pairs in such partition would yield a result of 6,000. This may be represented in associated output data 16 as a key/value pair with "the" as a key and "6,000" as a value (e.g., {the, 6000}). Such key/value pair may indicate that "the" appears 6,000 times in the input data text of this example. Once all the reduce processes 15 have been executed, producing output data 16, and subsequently combined or merged into a final output data set, the top N key/value pairs may be found.

In the foregoing example, and with reduce processes $15_1$ and $15_2$ as shown in FIG. 1, portions 14 of intermediate data might be allocated among reduce processes 15. In this example, all intermediate data 13 containing key/value pairs with keys starting with letters "A" through "M" might be presented to one reduce process 15 in a portion 14 of intermediate data. Intermediate data 13 with key/value pairs having keys commencing with "N" through "Z" may then be assigned for processing to another reduce process 15 in a different portion 14 of intermediate data. A "load" on a particular reduce process 15 may depend on how many partitions of intermediate data 13 have keys that fall within the range specified for an associated portion 14 of intermediate data, and on how many key/value pairs are contained in such partitions.

There are disadvantages to finding the top N pairs according to this particular map-reduce scenario. First, all the reduce processes are executed irrespective of whether the split corresponding to the reduce process contributes some key/value pairs to the final top N set or not. Also, the top N pairs are generated only after all the reduce processes have been completed.

According to example embodiments, these and other disadvantages may be addressed by advantageously exploiting the distribution of large data sets in order to avoid the necessity of running all of the reduce processes that are required for finding the top N pairs according to the particular map-reduce algorithm described above. A general description of the approach according to example embodiments is described immediately below, followed thereafter by a specific example in accordance with one example embodiment.

According to example embodiments, a map process may read key/value pairs one by one from an associated grouping of input data, or "bucket." Such key/value pairs may be aggregated if the same key repeats. For example, once a map process reads all associated key/value pairs, the map process may split the key/value pairs based on a signature or hash function on the key. Map processes may use the same signature function, and any function that maps keys to a finite set of integers may work as a signature function. For example, if the key is a string of characters, the length function of the character string may comprise a signature function as long as the length of the key is bounded by a finite value.

While performing the splitting, a map process may maintain a record of a maximum value of each split. That is, from among key/value pairs found in a split, there is at least one key/value pair whose value portion is greater than the value portions of the other key/value pairs. In one particular embodiment, the maximum value of the split represents the number of times that the most frequently occurring term in the split occurs. By maintaining a record of the maximum value from each split, it may be possible to verify or determine whether the top N key/value pairs have been obtained prior to executing all of the reduce processes. This will be explained in further detail below.

A map process may also compute one or more statistics for individual splits such as a mean, a variance, etc. At the end of a map process, computed statistics may be stored in some pre-specified memory location so that the statistics may be subsequently used to compute a density function, which is also explained in further detail below.

Regarding the density function, any function which gives a useful approximation of a contribution of a split to the top N pairs may act as a density function for obtaining a density value for splits. The density value for a split may be a number that serves to rank or score a split relative to the other splits. Typically, but not necessarily, a split having a density value that is greater than another split may be said to also have more key/value pairs that are also members of the top N pairs.

However, example embodiments do not depend on the accuracy of the density function in order to obtain top N pairs. Example embodiments may merely require that the density function result in a relative measure of the contribution of individual splits to a top N set. In other words, as long as the density function results in density values that reflect the relative contribution of the individual splits to top N pairs, just how closely the selected density function comes to approximating the actual contribution of the split to top N pairs is immaterial.

In some embodiments, a density function for a split may include a mean of the data values found in the split. That is, add the values of each key/value pair in the split and divide the resulting sum by the number of key/value pairs. In other embodiments, a density function may be a sum of a mean of the data values found in the split and a log of a variance of the data values. Other density functions will be apparent to those of skill in the art.

By applying a selected density function to splits, a density value for individual splits may be obtained. A density value of a split may provide a measure of the contribution of each split to a top N set. A first split having a higher density value than a second split may indicate the first split contributes more pairs to the top N pairs than the second split.

After density values have been obtained for splits, reduce processes may be, for example, executed on one or more splits that are determined to have a relatively large density value. Then, after the reduce processes are executed, a verification process is executed to determine whether the top N pairs are obtained.

If all of the top N pairs are obtained, then the goal is achieved and the process ends. If less than N pairs are obtained from executing one more reduce processes on the selected splits, then an additional number of splits having relatively high density values are selected and the reduce processes are run for those splits. Afterwards, a verification process is executed as before to determine if the top N pairs are obtained.

The iterative process described above may be repeated numerous times until top N pairs are obtained. However, in particular embodiments top N pairs may be obtained well before reduce processes are run for all splits.

As an illustrative, non-limiting example according to one example embodiment, let us suppose that a query is received for the top three (N=3) most frequently occurring terms in a body of data. Let us further assume that the data is given in two input "buckets," which means that two map processes are to be executed, one for each bucket. The length of the terms will be the "signature" (hash) function used in the map process. For simplicity, further assume that only terms having character length 1, 2, 3, and 4 appear in the body of data. Therefore, each map process results in four splits.

Tables I and II, which appear below, correspond to the first and second map processes (or buckets), respectively. Tables I and II show example terms in the splits, a frequency of occurrence of terms, a maximum frequency of occurrence from among the terms of the split, and the average frequency value from among the terms of the split, which in this particular embodiment is a density value for the individual splits. For example, referring to Table I, the average frequency value for each of the four splits resulting from the first map process indicate that Split Three has, on average, the highest contribution to the top N pairs, while Split One contributes the least amount of key/value pairs to the top N pairs. Similarly, referring to Table II, Split Two and Split One are seen to contribute the most and least, respectively, to the top N pairs from among the splits of the second map process.

TABLE I

First map process

| Split One | | Split Two | | Split Three | | Split Four | |
| --- | --- | --- | --- | --- | --- | --- | --- |
| terms | frequency | terms | frequency | terms | frequency | terms | frequency |
| a | 11 | an | 100 | and | 90 | from | 10 |
| b | 2 | am | 3 | off | 10 | find | 1 |
| c | 2 | be | 5 | man | 7 | most | 2 |
| d | 1 | of | 80 | the | 150 | when | 4 |
| max. value | 11 | | 100 | | 150 | | 10 |
| density | 4 | | 47 | | 64.25 | | 4.25 |

TABLE II

Second map process

| Split One | | Split Two | | Split Three | | Split Four | |
| --- | --- | --- | --- | --- | --- | --- | --- |
| terms | frequency | terms | frequency | terms | frequency | terms | frequency |
| a | 10 | an | 150 | and | 80 | from | 15 |
| b | 1 | am | 7 | off | 13 | find | 4 |
| c | 1 | be | 9 | the | 7 | most | 6 |
| d | 4 | of | 70 | wow | 1 | when | 1 |
| max. value | 10 | | 150 | | 80 | | 15 |
| density | 4 | | 59 | | 25.25 | | 6.5 |

By visually inspecting Tables I and II, it is easily noticed, due to relatively few terms in each split, that the term "an" appears 100 times in Split Two of Table I and 150 times in Split Two of Table II. Thus, the term "an" is the most frequently occurring term in the body of data. Tables I and II further reveal that the next two most frequently appearing terms are "and" (170 times) and "the" (157 times). Of course, the example illustrated here was chosen for simplicity and ease of explanation, in particular real world applications example embodiments may operate on data sets that are much larger. At any rate, before this particular example is described any further, it is helpful to summarize the top three most frequently occurring terms from Tables I and II. Table III, which appears below, summarizes the top three most frequently occurring terms from Tables I and II.

TABLE III

| Top three most frequently occurring terms | |
| --- | --- |
| Term | Frequency |
| an | 250 |
| and | 170 |
| the | 157 |

Next, according to an example embodiment, a combined maximum value for the four splits is obtained by summing the maximum values for the respective splits from the map processes. For instance, the combined maximum value for Split One is 21, which is obtained by adding the value from the second column, seventh row of Table I (11) to the value found in the second column, seventh row of Table II (10). Similarly, the combined maximum values for Split Two, Split Three, and Split Four is 250, 230, and 25, respectively.

Additionally, a combined density value for a particular split (e.g., Split Two) may be obtained by calculating the mean of the two individual density terms that were obtained from the individual map processes. For instance, the combined density value for Split One is 4, which is obtained by averaging the value from the second column, eighth row of Table I and the value from the second column, eighth row of Table II. Likewise, the combined density value for Split Two is 53, which is obtained by averaging the value from the fourth column, eighth row of Table I and the value from the fourth column, eighth row of Table II. The combined density values for Split 3 and Split 4 are obtained in a similar manner. Thus, in this example, a density function for a split may comprise a mean of the average frequency terms for that particular split in all map processes. Table IV, shown below, summarizes a combined maximum value and a combined density value for each of the splits.

TABLE IV

| combined maximum value and combined density value for each split | | | | |
| --- | --- | --- | --- | --- |
| | Split One | Split Two | Split Three | Split Four |
| Max. value | 21 | 250 | 230 | 25 |
| Density value | 4 | 53 | 47.75 | 5.375 |

Table IV illustrates that Split Two has the highest density value, which is an indication that among the four splits, Split Two most likely contributes the most key/value pairs to the top three set. Let us assume that in this example, only one split is chosen for processing at a time. Therefore, a reduce process is executed on Split Two first. After the reduce process is executed on Split Two, the top three terms obtained from the split are summarized in Table V below.

Table V illustrates that the terms "an," "of," and "the" are the top three most frequently occurring terms from among the combined terms of Split Two from the first map process (Table I) and Split Two from the second map process (Table II). These terms may be referred to as the local top three terms for Split Two. Generally speaking, example embodiments may have up to M map processes, with up to K splits for each map process. Then, for purposes of this disclosure, the phrase "local top N" generically refers to the top N values taken from among the combined values of Split k from the first map process, Split k from the second map process, . . . , etc., up to Split k from the $M^{th}$ map process, where $1 \leq k \leq K$.

TABLE V

Top three terms from Split Two

| Term | Frequency |
| --- | --- |
| an | 250 |
| of | 150 |
| be | 14 |

At this point in the example embodiment, a verification process determines whether the top three terms have been obtained (rendering further reduce processes unnecessary). To facilitate this process, let the variable REM_MAX be the greatest combined maximum value from among the splits that have yet to be processed. Referring to Table IV, the greatest value among the remaining splits (Splits One, Three, and Four) is 230 (found in the third column, first row of Table IV), so the value of REM_MAX is set to 230. From Table V, the frequency of the term "an" is 250, and since 250 is greater than the value of REM_MAX the term "an" is among the top three terms. However, the terms "of" and "be" have frequencies of 150 and 14, respectively, which are less than the value of REM_MAX. Therefore, in this example only one term ("an") in the top three set has been obtained after running the first reduce process, and the remaining two most frequently occurring terms in the top three set may be obtained by executing one or more additional reduce processes.

From Table IV, Split Three has the next highest density value so Split Three is selected as the next split on which to execute a reduce process on. After executing a reduce process on Split Three, the local top three terms obtained from the split are summarized in Table VI below.

TABLE VI

Top three terms from Split Three

| Term | Frequency |
| --- | --- |
| and | 170 |
| the | 157 |
| of | 23 |

Now, the value of REM_MAX from the remaining splits (Split One and Split Four) is 25. Since the frequencies of the terms "and" and "the" are both greater than REM_MAX, they must be the remaining two terms in the top three set. At this point, the top three set ("an," "and," and "the") has been obtained after executing reduce processes for only Splits Two and Three. Therefore, in this particular example, half the number of reduce processes are executed compared to the particular map-reduce process that was described above (where all the reduce processes are executed) in order to obtain the top three set. Neither Split One nor Split Four can contribute to the top three set because the combined maximum value of these splits (46) is less than 157 (the frequency of "the," the least-frequent term in the top three set). The combined maximum value of Splits One and Four is obtained by summing the value found in column 1, row 1 of Table IV and the value found in column 4, row 1 of Table IV.

As was seen in the example described above, the number of reduce processes that are launched may be significantly reduced compared to the particular map-reduce algorithm having the disadvantages described above. This may result in a rather large performance impact as each reduction process that is executed typically copies the splits files from the machines where the map processes were run. Additionally, computation of the statistics (e.g., mean, variance, etc) for each split may not significantly add processing time to the algorithm.

According to example embodiments, the top N pairs may be found before all the reduce processes are run. This is also more efficient than the particular map-reduce setup that was described above, where all reduce processes must be completed before the top N pairs are output.

The general algorithm according to example embodiments does not depend on the domain of the keys or of the values, nor does it depend on the distribution of the data. The general algorithm according to example embodiments may be applied to data having any distribution. In the worst-case scenario where a data set is distributed approximately evenly, resulting in equal density values for each split, the performance of example embodiments is no worse than the particular map-reduce algorithm.

Figure 2:
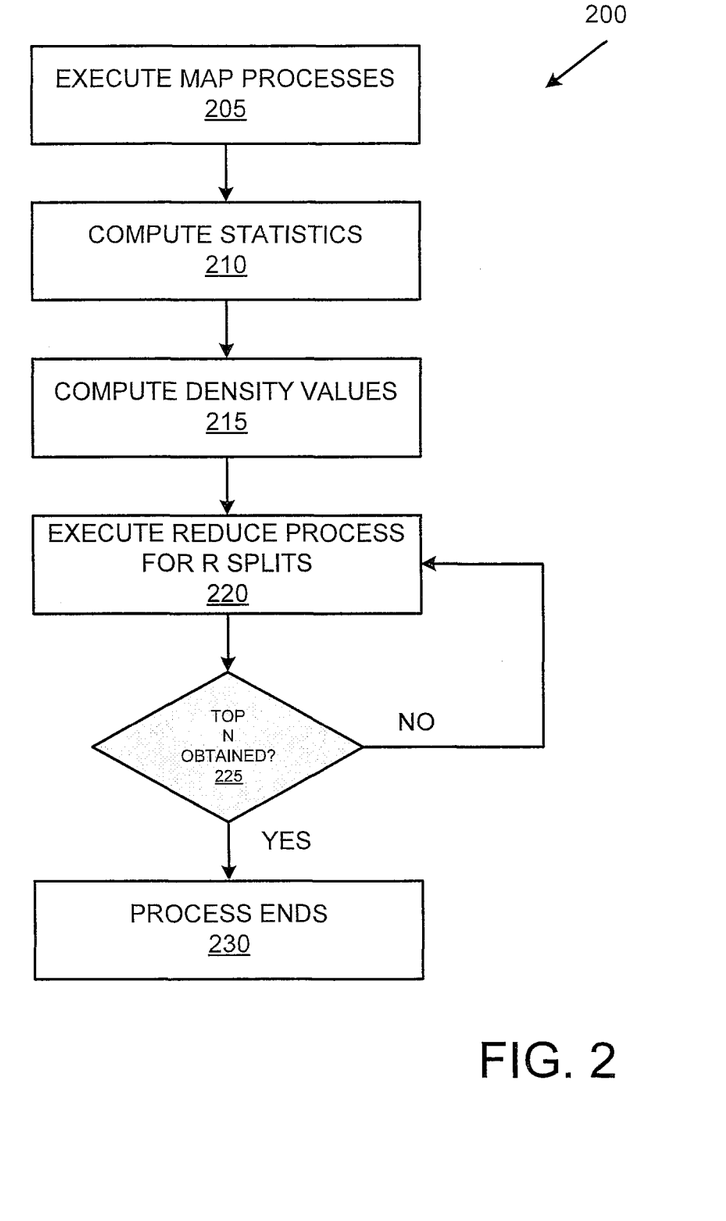
FIG. 2 is a flowchart illustrating a process for finding the top N pairs in a map-reduce setup according to example embodiments.

FIG. 2 is a flowchart illustrating a process 200 for finding the top N pairs in a map-reduce setup according to some example embodiments, including the specific example embodiment that was described above. Process 200 begins with subprocess 205, where one or more map processes are run for one or more key/value pairs in one or more input buckets. The map processes split the key/value pairs in the input buckets according to a pre-selected signature or hash function. In the particular example embodiment described above, the signature function that was used was the length of the text string. Other signature functions could of course be selected, depending on the nature of the data.

Next, in subprocess 210, selected statistics for the splits that were obtained from the map processes are computed. In some embodiments, the computation of the statistics may be performed as part of the map process. As was seen for the specific example embodiment described above, these statistics may include the maximum value found in the split, as well as the mean of the values of the split. Other statistics, such as variance, log(variance), median, etc., may be calculated depending on the selected density function.

Any heuristic function which gives a relatively good approximation of the contribution of the split to the top N pairs may act as a density function for obtaining a density value for the splits. In the specific example outlined above, the density function was the mean of the means for each split taken from the individual map processes. That is, the mean for Split One was obtained by averaging two values, in which each of the two values were themselves the mean of the values obtained in Split One from map process 1 and the mean of the values obtained in Split One from map process 2. As indicted in subprocess 215, the density values are computed based upon the selected density function. The density values indicate the relative contribution of each split to the top N set.

Once the density values for each split are obtained, reduce processes are run for R splits having the relatively greatest density values, as indicated in subprocess 220. The value of R is an indication of the number of reduce processes that are run at a time. For example, if R is 1, a reduce process is run for the split having the greatest relative density value compared to the other splits. If R is 2, reduce processes for the two splits having the greatest and second greatest density values are run, and so forth.

After subprocess 220 is run, the top N values for the R splits are obtained, but it is still unknown whether the top N values for the body of data have been found. Thus, a verification process is performed in subprocess 225. If the members of the top N set have been found after processing the R splits, then the process 200 ends at subprocess 230. However, if less than N members of the top N set are found, process 200 returns to subprocess 220, where reduce processes are run for another R splits. The R splits are selected in the same manner as before, with the splits having the greatest relative density values being selected. Subprocesses 220 and 225 may be repeated any number of times until the top N set has been found, but in no case will the total number of reduce processes that are run exceed the total number of splits.

For the particular example that was described above, the verification process included comparing the top three terms in the split to the REM_MAX value from among the remaining splits that had not yet had a reduce process run on them. If the value of the term was greater than the REM_MAX value, then the term was part of the top three set.

Figure 3:
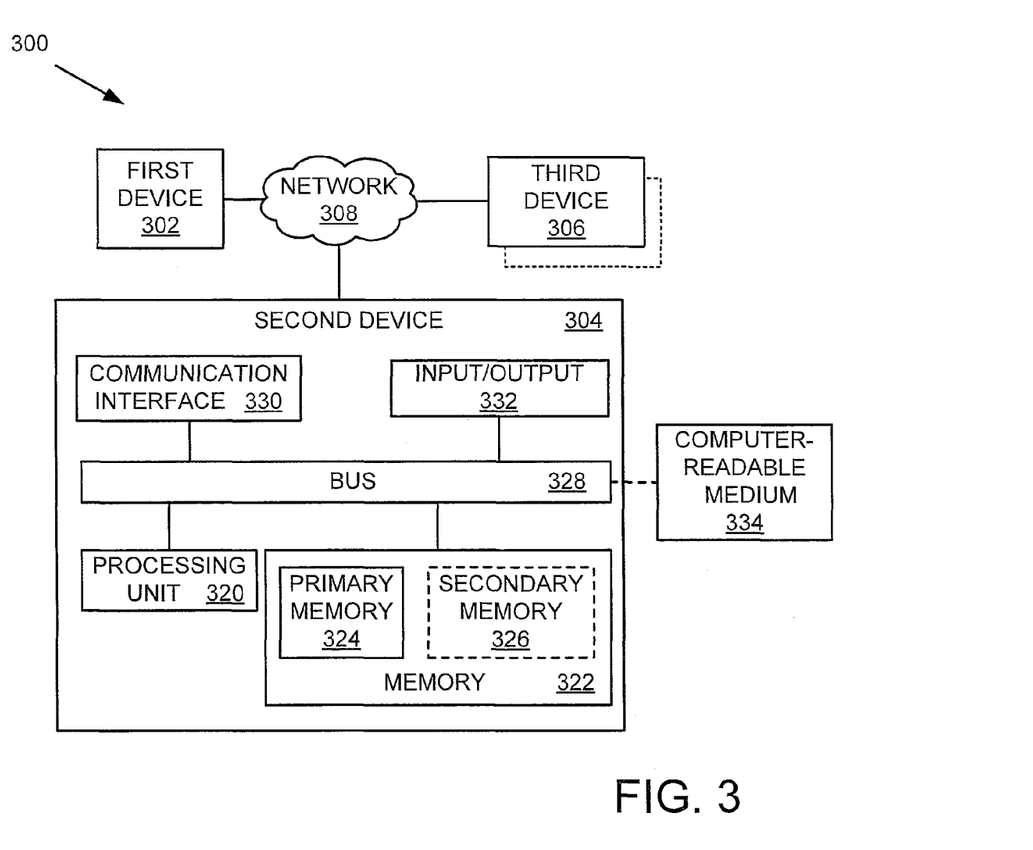
FIG. 3 is a schematic diagram illustrating an example embodiment of a special purpose computing system that may include one or more devices configurable to execute all or a portion of the top N pair finding process illustrated in FIG. 2.

FIG. 3 is a schematic diagram illustrating an example embodiment of a special purpose computing system 300 that may include one or more devices configurable to execute all or a portion of a top N pair finding process using one or more techniques illustrated above, for example. In a particular example, although claimed subject matter is not limited in this respect, such a top N pair finding process may be implemented to process queries or requests that are received from devices coupled to network 308. System 300 may include, for example, a first device 302, a second device 304 and a third device 306, which may be operatively coupled together through the network 308.

In a particular example embodiment, the functionality illustrated in the flowchart of FIG. 2 may be centrally implemented by the processing unit 320 of the secondary device 304 by executing instructions stored in the primary memory 324. According to other embodiments, the functionality illustrated in the flowchart of FIG. 2 may be distributed across multiple ones of the first, second, and third devices 302, 304, and 306 that are linked by the network 308. These examples are presented for purposes of illustration and not for limitation, thus the claimed subject matter is not so limited.

First device 302, second device 304 and third device 302, as shown in FIG. 3, may be representative of any device, appliance or machine that may be configurable to exchange data over network 308. By way of example but not limitation, any of first device 302, second device 304, or third device 302 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 308, as shown in FIG. 3, is representative of one or more communication links, processes, and/or resources configurable to support the exchange of data between at least two of first device 302, second device 304, and third device 306. By way of example but not limitation, network 308 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 306, there may be additional like devices operatively coupled to network 308.

It is recognized that all or part of the various devices and networks shown in system 300, and the processes and methods as further described herein, may be implemented using or otherwise include hardware, firmware, software, or any combination thereof.

Thus, by way of example but not limitation, second device 304 may include at least one processing unit 320 that is operatively coupled to a memory 322 through a bus 328.

Processing unit 320 is representative of one or more circuits configurable to perform at least a portion of a data computing procedure or process. By way of example but not limitation, processing unit 320 may include one or more processors, controllers, microprocessors, microcontrollers, application specific integrated circuits, digital signal processors, programmable logic devices, field programmable gate arrays, and the like, or any combination thereof.

Memory 322 is representative of any data storage mechanism. Memory 322 may include, for example, a primary memory 324 and/or a secondary memory 326. Primary memory 324 may include, for example, a random access memory, read only memory, etc. While illustrated in this example as being separate from processing unit 320, it should be understood that all or part of primary memory 324 may be provided within or otherwise co-located/coupled with processing unit 320.

Secondary memory 326 may include, for example, the same or similar type of memory as primary memory and/or one or more data storage devices or systems, such as, for example, a disk drive, an optical disc drive, a tape drive, a solid state memory drive, etc. In certain implementations, secondary memory 326 may be operatively receptive of, or otherwise configurable to couple to, a computer-readable medium 334. Computer-readable medium 334 may include, for example, any medium that can carry and/or make accessible data, code and/or instructions for one or more of the devices in system 300.

Second device 304 may include, for example, a communication interface 330 that provides for or otherwise supports the operative coupling of second device 304 to at least network 308. By way of example but not limitation, communication interface 330 may include a network interface device or card, a modem, a router, a switch, a transceiver, and the like.

Second device 304 may include, for example, an input/output 332. Input/output 332 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 332 may include an operatively configured display, speaker, keyboard, mouse, trackball, touch screen, data port, etc.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the detailed description presented above, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the above detailed description were presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated.

For example, one or more portions of a memory device may store signals representative of data and/or information as expressed by a particular state of the memory device. In an implementation, an electronic signal representative of data and/or information may be "stored" in a portion of a memory device by affecting or changing the state of such portions of the memory device to represent data and/or information as binary information (e.g., ones and zeros). As such, in a particular implementation, such a change of state of the portion of memory to store a signal representative of data and/or information constitutes a transformation of a memory device to a different state or thing.

It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the foregoing discussion, it is appreciated that throughout this specification discussions utilizing terms such as "processing," "computing," "calculating," "associating," "identifying," "determining," "allocating," "generating," and/or the like refer to the actions and/or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," "and/or," and "or" as used herein may include a variety of meanings that will depend at least in part upon the context in which it is used. Typically, "and/or" as well as "or" if used to associate a list, such as A, B and/or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

While there have been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:

executing instructions by a special purpose computing apparatus, based, at least in part, on one or more signals representative of a plurality of splits defined by a map process to:

determine corresponding density values of individual ones of the plurality of splits, wherein a density value for a particular one of the plurality of splits is representative of an expected contribution of corresponding one of the plurality of splits to a top N key/value pairs of a data set, the data set comprising the key/value pairs;

select a first one of the plurality of splits having a largest one of the corresponding density values and run a first reduce process on the first one of the plurality of splits to determine a first set of key/value pairs;

determine whether the first set of key/value pairs comprises the top N key/value pairs for the data set and, in response to a determination that the first set of key/value pairs do not contain the top N key/value pairs for the data set, run a second reduce process on the at least a second one of the plurality of splits to determine at least a second set of key/value pairs;

wherein the determination of whether the first set of key/value pairs does not contain the top N key/value pairs for the data set is based, at least in part, on a determination of whether the first set of key/value pairs contains fewer than N keys having corresponding values higher than at least a maximum value for the at least a second one of the individual ones of the plurality of splits; and generate one or more signals representing the top N key/value pairs of the data set from the first set of key/value pairs or the at least a second set of key/value pairs.

2. The method of claim 1, wherein the at least a second one of the plurality of splits includes at least one split.

3. The method of claim 1, further comprising further executing the instructions by the special purpose computing apparatus to run the reduce process on the at least a second one of the plurality of splits to provide one or more signals representing the local top N key/value pairs.

4. The method of claim 3, further comprising further executing the instructions by the special purpose computing apparatus to determine whether the top N key/value pairs are obtained from a first processed split of the at least a second split.

5. The method of claim 1, in which computing the density value comprises selecting a density function for the data set.

6. An article comprising:
a non-transitory machine-readable medium comprising instructions stored thereon which, in response to being executed by a special purpose computing apparatus, direct the special purpose computing apparatus, based, at least in part, on one or more signals representative of a plurality of splits defined by a map process to:
determine corresponding density values of individual ones of the plurality of splits, wherein a density value for a particular one of the plurality of splits is representative of an expected contribution of corresponding one of the plurality of splits to a top N key/value pairs of a data set, the data set comprising the key/value pairs;
select a first one of the plurality of splits having a largest one of the corresponding density values and run a first reduce process on the first one of the plurality of splits to determine a first set of key/value pairs;
determine whether the first set of key/value pairs comprises the top N key/value pairs for the data set and, in response to a determination that the first set of key/value pairs do not contain the top N key/value pairs for the data set, run a second reduce process on the at least a second one of the plurality of splits to determine at least a second set of key/value pairs;
wherein in response to being executed by said special purpose computing apparatus, the instructions further direct the special purpose computing apparatus perform the determination of whether the first set of key/value pairs does not contain the top N key/value pairs for the data set based, at least in part, on a determination of whether the first set of key/value pairs contains fewer than N keys having corresponding values higher than at least a maximum value for the at least a second one of the individual ones of the plurality of splits; and
generate one or more signals representing the top N key/value pairs of the data set from the first set of key/value pairs or the at least a second set of key/value pairs.

7. The article of claim 6, wherein in response to being executed by said special purpose computing apparatus, the instructions further direct the special purpose computing apparatus to store a record of a maximum value of each split.

8. The article of claim 7, wherein in response to being executed by said special purpose computing apparatus, the instructions further direct the special purpose computing apparatus to compute statistics for the splits, where statistics include a mean and a variance.

9. The article of claim 8, wherein determining the density value for the splits comprises determining a density function based at least in part on the statistics.

10. The article of claim 9, in which the density function comprises a mean.

11. The article of claim 9, in which the density function comprises a sum of a mean and a variance.

12. A special purpose computing apparatus comprising:
one or more processors programmed with instructions, based, at least in part, on one or more signals representative of a plurality of splits defined by a map process that implements a signature function to:
determine corresponding density values of individual ones of the plurality of splits, wherein a density value for a particular one of the plurality of splits is representative of an expected contribution of corresponding one of the plurality of splits to a top N key/value pairs of a data set, the data set comprising the key/value pairs;
select a first one of the plurality of splits having a largest one of the corresponding density values and run a reduce process on the first one of the plurality of splits to determine a first set of key/value pairs;
determine whether the first set of key/value pairs comprises the top N key/value pairs for the data set and, in response to a determination that the first set of key/value pairs do not contain the top N key/value pairs for the data set, run a second reduce process on the at least a second one of the plurality of splits to determine at least a second set of key/value pairs;
wherein the one or more processors further programmed with instructions to perform the determination of whether the first set of key/value pairs does not contain the top N key/value pairs for the data set based, at least in part, on a determination of whether the first set of key/value pairs contains fewer than N keys having corresponding values higher than at least a maximum value for the at least a second one of the individual ones of the plurality of splits; and
generate one or more signals representing the top N key/value pairs of the data set from the first set of key/value pairs or the at least a second set of key/value pairs.

13. The special purpose computing apparatus of claim 12, in which the signature function comprises a length function of a character string.

14. The special purpose computing apparatus of claim 12, the one or more processors further programmed with instructions to aggregate the values of any key/value pairs that share the same key.

15. The special purpose computing apparatus of claim 12, the one or more processors further programmed with instructions to verify if any of the local top N key/value pairs belong to the top N key/value pairs.

16. The special purpose computing apparatus of claim 15, in which verification comprises comparing each of the local top N key/value pairs to a maximum value taken from the splits external to the first subset.

* * * * *